United States Patent
Katayama

(10) Patent No.: US 7,352,967 B1
(45) Date of Patent: Apr. 1, 2008

(54) DATA TRANSMISSION SYSTEM

(75) Inventor: Masatoshi Katayama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 454 days.

(21) Appl. No.: 10/049,613

(22) PCT Filed: Oct. 6, 2000

(86) PCT No.: PCT/JP00/07000

§ 371 (c)(1),
(2), (4) Date: Feb. 21, 2002

(87) PCT Pub. No.: WO01/99323

PCT Pub. Date: Dec. 27, 2001

(30) Foreign Application Priority Data

Jun. 21, 2000 (JP) .................. PCT/JP00/04065

(51) Int. Cl.
*H04J 14/00* (2006.01)

(52) U.S. Cl. ..................................... 398/71

(58) Field of Classification Search .............. 398/83, 398/84, 99–101, 139, 41, 63, 66–68, 70–78, 398/58; 370/3; 385/37, 45; 359/515
See application file for complete search history.

(56) References Cited

U.S. PATENT DOCUMENTS

| 4,481,621 A * | 11/1984 | Schmack et al. ............. 398/75 |
| 4,712,859 A * | 12/1987 | Albanese et al. ............ 385/24 |
| 5,202,780 A * | 4/1993 | Fussanger .................... 398/72 |
| 5,446,809 A | 8/1995 | Fritz et al. |
| 5,479,547 A * | 12/1995 | Kunikane et al. ............. 385/47 |
| 5,799,120 A * | 8/1998 | Kurata et al. ................. 385/45 |
| 5,960,135 A * | 9/1999 | Ozawa ........................ 385/24 |
| 6,130,974 A * | 10/2000 | Rivoallan .................... 385/37 |
| 6,411,410 B1 * | 6/2002 | Wright et al. ................. 398/79 |
| 6,556,757 B2 * | 4/2003 | Ellison et al. ............. 385/127 |
| 6,577,414 B1 * | 6/2003 | Feldman et al. ............ 725/129 |

FOREIGN PATENT DOCUMENTS

| EP | 0 699 927 | 3/1996 |
| EP | 0 916 445 | 5/1999 |
| JP | 63-132205 | 6/1988 |
| JP | 4-037225 | 2/1992 |
| JP | 5-063659 | 3/1993 |
| JP | 5-112635 | 5/1993 |
| JP | 5-142600 | 6/1993 |
| JP | 6-250017 | 9/1994 |
| JP | 9-64820 | 3/1997 |
| JP | 11-305044 | 11/1999 |

* cited by examiner

*Primary Examiner*—Jason Chan
*Assistant Examiner*—Quan-Zhen Wang
(74) *Attorney, Agent, or Firm*—Oblon, Spivak, McClelland, Maier & Neustadt, P.C.

(57) ABSTRACT

A data transmission system includes subscriber units and a central office unit which are interconnected via optical fibers. The central office unit multiplexes a video signal with signals other than the video signal to deliver them to the multiple subscriber units. Each subscriber unit demultiplexes a received signal, and includes a wavelength division multiplexer/demultiplexer having a function of eliminating a particular wavelength signal in the subscriber unit.

13 Claims, 6 Drawing Sheets

DATA TRANSMISSION SYSTEM

TECHNICAL FIELD

The present invention relates to a data transmission system comprising subscriber units connected to a central office unit via optical fibers, in which the central office unit multiplexes a video signal with signals other than the video signal and delivers them to the multiple subscriber units, and the subscriber units each demultiplex their own received signals.

BACKGROUND ART

FIG. 1 is a block diagram showing a configuration of an ATM-PDS (Asynchronous Transfer Mode Passive Double Star) system as a conventional data transmission system. In FIG. 1, the reference numeral 101 designates a central office unit comprising multiple transmitting and receiving sections, although only one transmitting and receiving section 114 is shown for simplicity. The reference numeral 102 designates a star coupler as an optical distributor that is connected to the central office unit 101 via an optical fiber 103; 104a-104c each designate an optical fiber connected to one of split output terminals of the star coupler 102; and 105a-105c each designate a subscriber unit connected to one of the optical fibers 104a-104c. Since the split number of a single star coupler is 32 at present, the total of 32 subscriber units can be connected to each star coupler by connecting them to the split output terminals via the optical fibers 104a-104c . . . .

The central office unit 101 comprises a transmitting laser diode (LD) 112 for outputting a video signal generated by a video signal generator 111 in the form of an optical signal; a wavelength division multiplexer/demultiplexer (WDM) 113 supplied with the output of the transmitting laser diode (LD) 112 and the output of the transmitting and receiving section 114; an electric signal multiplexer/demultiplexer 115; and a processing section 116. The transmitting and receiving section 114 includes a wavelength division multiplexer/demultiplexer (WDM) 121; a receiving photodiode (PD) 123 for converting an optical signal supplied from the wavelength division multiplexer/demultiplexer (WDM) 121 into an electric signal; a transmitting laser diode (LD) 122 for converting an electric signal to an optical signal; and a signal processor 124. The processing section 116 includes a signal processor 117, a transmitting laser diode (LD) 118 and a receiving photodiode (PD) 119.

The subscriber unit 105a comprises a wavelength division multiplexer/demultiplexer (WDM) 131a connected to the fiber 104a; a receiving photodiode (PD) 132a for receiving a wavelength band of a video signal separated by the wavelength division multiplexer/demultiplexer (WDM) 131a and for outputting it as an electric signal; a video receiver 133a supplied with the electric signal; and a transmitting and receiving section 134a supplied with signals other than the video signal separated by the wavelength division multiplexer/demultiplexer (WDM) 131a. The transmitting and receiving section 134a includes a wavelength division multiplexer/demultiplexer (WDM) 141a; a receiving photodiode (PD) 142a for converting an optical signal fed from the wavelength division multiplexer/demultiplexer (WDM) 141a into an electric signal; a transmitting laser diode (LD) 143a for converting an electric signal into an optical signal; an electric signal multiplexer/demultiplexer 144a; an A/D (Analog/Digital) converter 145a to which a telephone 147a is connected; and an A/D (Analog/Digital) converter 146a to which a facsimile machine 148a is connected. A personal computer 149a is directly connected to the electric signal multiplexer/demultiplexer 144a. The subscriber unit 105b connected to the optical fiber 104b has a similar configuration. When no video receiver is required as in the subscriber unit 105b, a terminator 135b is connected in place of the receiving photodiode (PD).

Next, the operation will be described.

In the central office unit 101, the video signal generator 111 supplies its video signal to the transmitting laser diode (LD) 112. The transmitting laser diode (LD) 112 supplies it to the wavelength division multiplexer/demultiplexer (WDM) 113 in the form of the optical signal. The wavelength division multiplexer/demultiplexer (WDM) 113 multiplexes the optical signal with the optical signal from the transmitting and receiving section 114, and supplies it to the star coupler 102 via the optical fiber 103. The star coupler 102 splits the signal and supplies the split signals to the subscriber units 105a, 105b and the like.

In the subscriber unit 105a, the wavelength division multiplexer/demultiplexer (WDM) 131a demultiplexes the input signal into the video signal and the other signals, and supplies the video signal to the video receiver 133a via the receiving photodiode (PD) 132a. On the other hand, the signals other than the video signal are supplied to the receiving photodiode (PD) 142a via the wavelength division multiplexer/demultiplexer (WDM) 141a in the transmitting and receiving section 134a, to be converted into the electric signal. Then, the electric signal multiplexer/demultiplexer 144a demultiplexes the electric signal into respective signals so that the telephone signal is supplied to the telephone set 147a via the A/D converter 145a, and the facsimile signal is supplied to the facsimile machine 148a via the A/D converter 146a. As for the computer signal, the electric signal multiplexer/demultiplexer 144a supplies it directly to the personal computer 149a.

On the other hand, as for the signals from the devices connected to the subscriber unit 105a such as the signal from the telephone set 147a, for example, the A/D converter 145a converts it to the digital signal, and supplies it to the transmitting laser diode (LD) 143a via the electric signal multiplexer/demultiplexer 144a. The transmitting laser diode (LD) 143a converts it to the optical signal, and supplies it to the star coupler 102 via the wavelength division multiplexer/demultiplexers (WDMs) 141a and 131a. The star coupler 102 sends it to the central office unit 101 via the optical fiber 103, where it is supplied to the receiving photodiode (PD) 123 via the wavelength division multiplexer/demultiplexers (WDMs) 113 and 121, to be converted into the electric signal and output. The output signal passes through the signal processor 124 and the electric signal multiplexer/demultiplexer 115, and is supplied to the processing section 116, where it passes through the signal processor 117, and is converted to the optical signal by the transmitting laser diode (LD) 118, again, to be transmitted to another station.

In the foregoing conventional data transmission system, it is considered preferable to divide the wavelength range 1480-1580 nm, which is assigned to the downlink signals from the central office unit to the subscriber units, into two regions of 1480-1530 nm and 1530-1580 nm, and to assign the longer wavelength region 1530-1580 nm to video signal deliverance. In this case, the subscriber unit requires the wavelength division multiplexer/demultiplexer (WDM) that demultiplexes the wavelength region 1480-1580 nm assigned to the downlink signal into the wavelength region 1530-1580 nm for the video signal and to the wavelength range 1480-1530 nm assigned to the signals other than the video signal.

As a typical conventionally used wavelength division multiplexer/demultiplexer (WDM), a spatial optical filter is known. FIG. 2 shows a spatial optical filter. It comprises a glass substrate 151, on a side of which a reflecting layer 152 is formed that reflects a particular wavelength signal. It further comprises, at both sides of the glass substrate 151, condenser lenses 153 and 154 which are coupled with the optical fibers 155 and 156, respectively, and a condenser lens 157 coupled with an optical fiber 158 in such a manner that the reflected light off the reflecting layer 152 is launched into the optical fiber 158 through the condenser lenses 157.

As described above, the spatial optical filter has a complicated configuration. In particular, it is difficult to align the optical axes of the optical fiber and of the condenser lenses, increasing the total cost. Since the expensive spatial optical filter is installed in the subscriber unit to separate the video signal and the signals other than the video signal, the subscriber unit is costly. This offers a problem in that a subscriber who does not want to receive the video service must purchase the expensive subscriber unit.

The present invention is implemented to solve the foregoing problem of the conventional system. Therefore, an object of the present invention is to provide an inexpensive subscriber unit for a subscriber who does not want to receive the video service.

DISCLOSURE OF THE INVENTION

According to a first aspect of the present invention, there is provided a data transmission system including subscriber units and a central office unit which are interconnected via optical fibers, the central office unit multiplexing a video signal with signals other than the video signal to deliver them to the multiple subscriber units, and each subscriber unit demultiplexing a received signal, the data transmission system comprising in the subscriber unit: a wavelength division multiplexer/demultiplexer (WDM) having a function of eliminating a particular wavelength signal.

It relieves a subscriber who does not want to receive the video service of the requirement of the expensive spatial optical filter for separating the video signal and the other signals. Thus, it offers an advantage of being able to provide the subscriber with the inexpensive subscriber unit capable of transmitting data other than the video signal without using the expensive spatial optical filter.

The wavelength division multiplexer/demultiplexer (WDM) of the data transmission system according to the present invention can reflect the particular wavelength signal to reject its input. Thus, it offers an advantage of being able to provide an inexpensive wavelength division multiplexer/demultiplexer (WDM) with a simple configuration.

The wavelength division multiplexer/demultiplexer (WDM) of the data transmission system according to the present invention can comprise a reflecting layer for reflecting the particular wavelength signal at an input end surface of an optical fiber of the subscriber unit. Thus, it offers an advantage of being able to provide an inexpensive wavelength division multiplexer/demultiplexer (WDM) with a simple configuration.

The reflecting layer of the wavelength division multiplexer/demultiplexer (WDM) of the data transmission system according to the present invention can consist of a dielectric multilayer filter. Therefore, it offers an advantage of being able to provide an inexpensive wavelength division multiplexer/demultiplexer (WDM) with a simple configuration.

The data transmission system according to the present invention can comprise an optical fiber with a core and a cladding that covers an external surface of the core, and that has multiple notches formed on the cladding to reflect the particular wavelength signal. Thus, it can increase the flexibility of the video signal to be separated.

The data transmission system according to the present invention can use an optical waveguide that is made of a polymer and absorbs a signal with a wavelength of 1650 nm as the wavelength division multiplexer/demultiplexer, and uses the signal with a wavelength of 1650 nm as the particular wavelength signal. It offers an advantage of being able to implement an inexpensive wavelength division multiplexer/demultiplexer (WDM) capable of absorbing the signal with a wavelength of 1650 nm.

According to a second aspect of the present invention, there is provided a data transmission system including subscriber units and a central office unit which are interconnected via optical fibers, the central office unit multiplexing a video signal with signals other than the video signal to deliver them to the multiple subscriber units, and each subscriber unit demultiplexing a received signal, the central office unit comprising: an optical amplifier for amplifying the video signal to be transmitted; and an optical distributor for distributing the video signal output from the optical amplifier, and supplying it to a wavelength division multiplexer/demultiplexer, wherein each of the subscriber units comprises a wavelength division multiplexer/demultiplexer having a function of eliminating a particular wavelength signal.

Thus, it offers an advantage of being able to share the video signal generator, thereby reducing its cost.

According to a third aspect of the present invention, there is provided a data transmission system including subscriber units and a central office unit which are interconnected via optical fibers, the central office unit multiplexing a video signal with signals other than the video signal to deliver them to the multiple subscriber units, and each subscriber unit demultiplexing a received signal, the central office unit comprising: a plurality of video signal generators for generating video signals with different wavelengths; a first wavelength division multiplexer/demultiplexer for multiplexing the video signals supplied from the plurality of video signal generators; an optical amplifier for amplifying the video signals output from the first wavelength division multiplexer/demultiplexer; and an optical distributor for distributing the video signals output from the optical amplifier to a second wavelength division multiplexer/demultiplexer, wherein each of the subscriber units comprises a wavelength division multiplexer/demultiplexer with a function of eliminating a particular wavelength signal.

Thus, it offers an advantage of being able to cope with an expected growing capacity in the near future easily.

According to a fourth aspect of the present invention, there is provided a data transmission system including subscriber units and a central office unit which are interconnected via optical fibers, the central office unit multiplexing a video signal with signals other than the video signal to deliver them to the multiple subscriber units, and each subscriber unit demultiplexing a received signal, the subscriber unit comprising: a first wavelength division multiplexer/demultiplexer for demultiplexing the video signals and signals other than the video signal; and a second wavelength division multiplexer/demultiplexer with a function of eliminating a particular wavelength signal.

Thus, it enables the second wavelength division multiplexer/demultiplexer to remove the remainder of the video signal the first wavelength division multiplexer/demultiplexer cannot fully separate. Therefore it can utilize an inexpensive WDM with comparatively low separation accuracy as the first wavelength multiplexer.

BEST MODE FOR CARRYING OUT THE INVENTION

The best mode for carrying out the invention will now be described with reference to the accompanying drawings.

Embodiment 1

Figure 3:
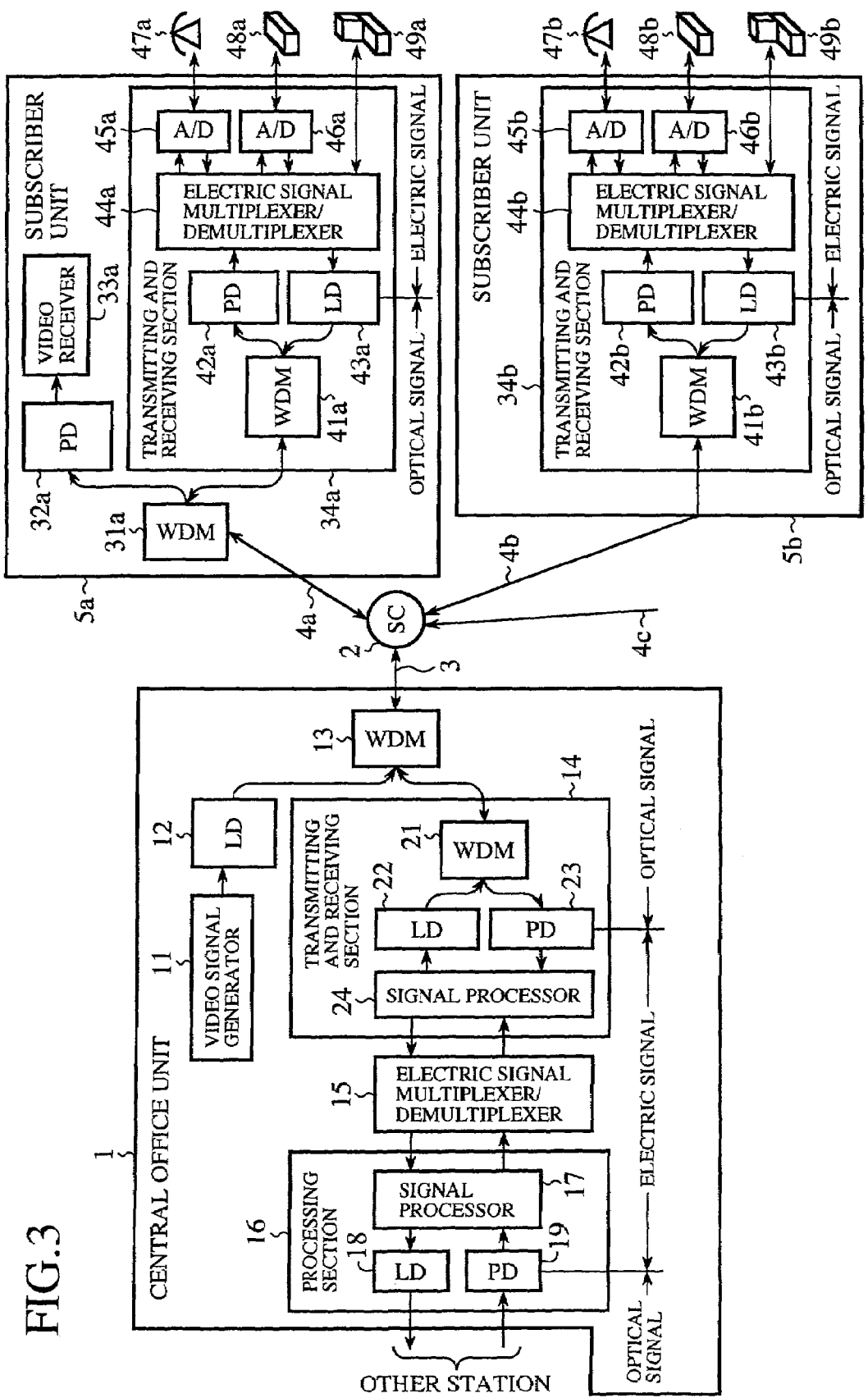
FIG. 3 is a block diagram showing a configuration of an embodiment 1 of the data transmission system in accordance with the present invention.

FIG. 3 is a block diagram showing a configuration of an embodiment 1 of the data transmission system in accordance with the present invention. In FIG. 3, the reference numeral 1 designates a central office unit comprising multiple transmitting and receiving sections, although only one transmitting and receiving section 14 is shown for simplicity of the description. The reference numeral 2 designates a star coupler (SC) as an optical distributor that is connected to the central office unit 1 via an optical fiber 3; 4a-4c each designate an optical fiber connected to one of split output terminals of the star coupler 2; and 5a and 5b each designate a subscriber unit connected to one of the optical fibers 4a and 4c. Since the split number of a single star coupler is 32 at present, the total of 32 subscriber units can be connected to each star coupler by connecting them to the split output terminals via the optical fibers 4a-4c . . . .

The central office unit 1 comprises a transmitting laser diode (LD) 12 for outputting a video signal generated by a video signal generator 11 in the form of an optical signal; a wavelength division multiplexer/demultiplexer (WDM) 13 supplied with the output of the transmitting laser diode (LD) 12 and the output of the transmitting and receiving section 14; an electric signal multiplexer/demultiplexer 15; and a processing section 16. The transmitting and receiving section 14 includes a wavelength division multiplexer/demultiplexer (WDM) 21; a receiving photodiode (PD) 23 for converting an optical signal fed from the wavelength division multiplexer/demultiplexer (WDM) 21 into an electric signal; a transmitting laser diode (LD) 22 for converting an electric signal to an optical signal; and a signal processor 24. The processing section 16 includes a signal processor 17, a transmitting laser diode (LD) 18 and a receiving photodiode (PD) 19.

The subscriber unit 5a comprises a wavelength division multiplexer/demultiplexer (WDM) 31a connected to the optical fiber 4a; a receiving photodiode (PD) 32a for receiving a wavelength band of a video signal separated by the wavelength division multiplexer/demultiplexer (WDM) 31a and for outputting it as an electric signal; a video receiver 33a supplied with the electric signal; and a transmitting and receiving section 34a supplied with signals other than the video signal separated by the wavelength division multiplexer/demultiplexer (WDM) 31a. The transmitting and receiving section 34a includes a wavelength division multiplexer/demultiplexer (WDM) 41a; a receiving photodiode (PD) 42a for converting an optical signal from the wavelength division multiplexer/demultiplexer (WDM) 41a into an electric signal; a transmitting laser diode (LD) 43a for converting an electric signal into an optical signal; an electric signal multiplexer/demultiplexer 44a; an A/D (Analog/Digital) converter 45a to which a telephone 47a is connected; and an A/D (Analog/Digital) converter 46a to which a facsimile machine 48a is connected. A personal computer 49a is directly connected to the electric signal multiplexer/demultiplexer 44a.

The wavelength division multiplexer/demultiplexer (WDM) 41a rejects the wavelength region of the video signal consisting of a 1530-1580 nm signal, for example. Since the subscriber unit 5b connected to the optical fiber 4b and the like has a configuration similar to the subscriber unit 5a, the description thereof is omitted here.

Figure 1:
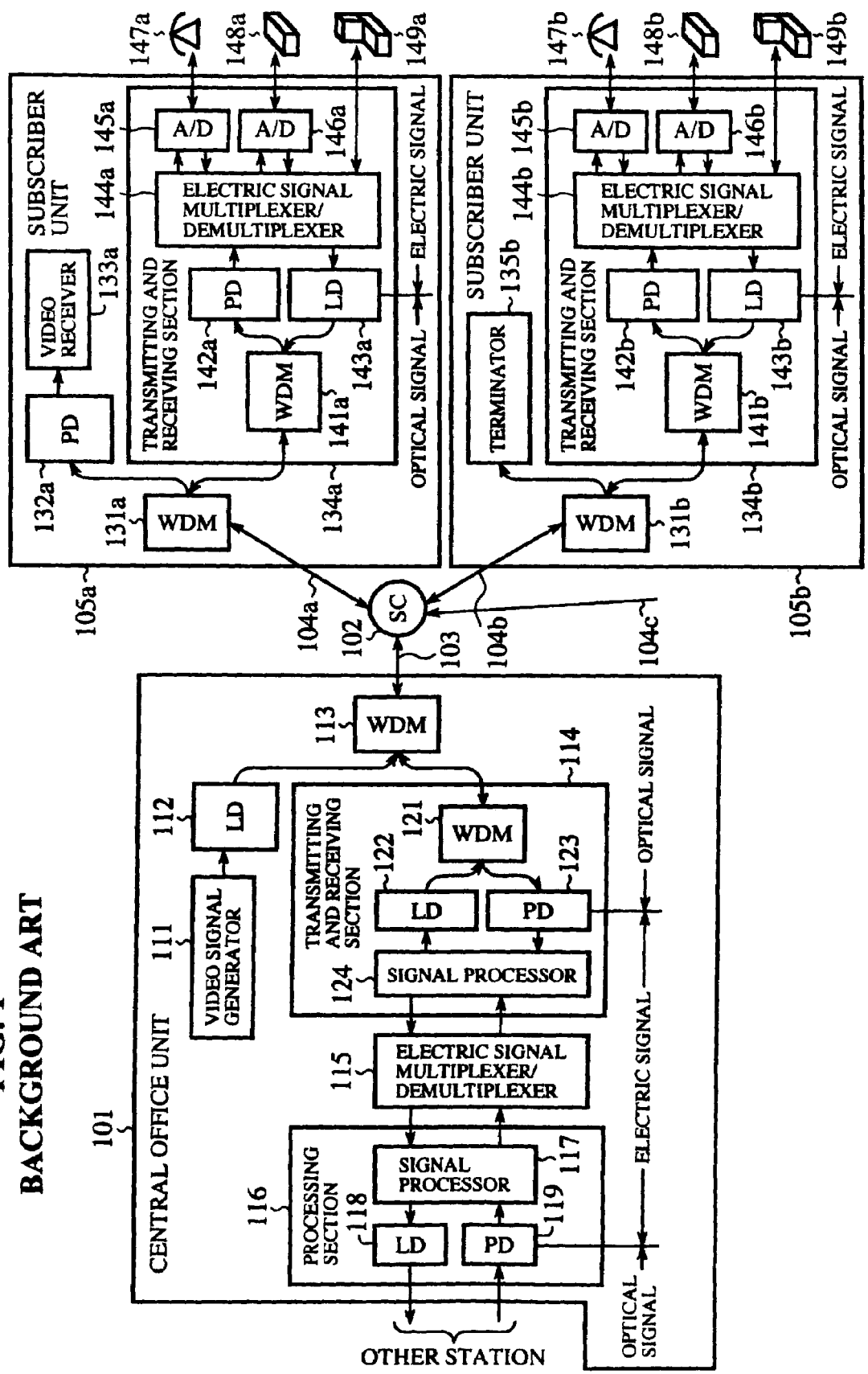
FIG. 1 is a block diagram showing a configuration of a conventional data transmission system.
Figure 2:
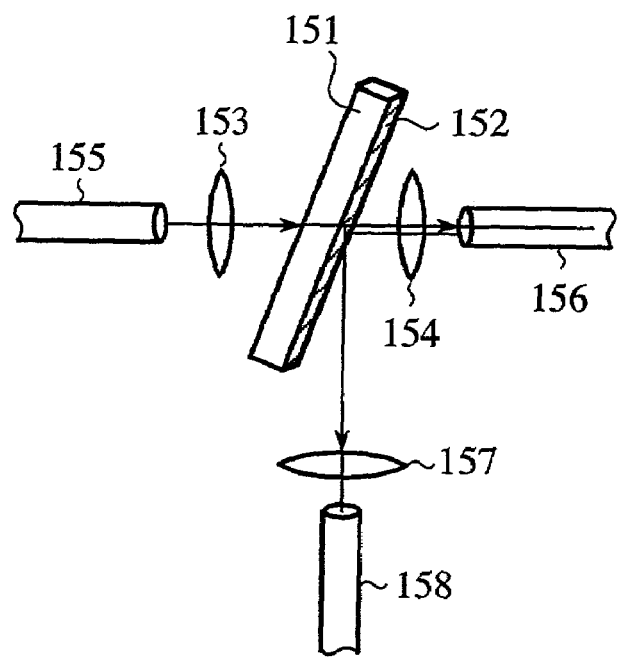
FIG. 2 is a schematic diagram showing a configuration of a spatial optical filter as a wavelength division multiplexer/demultiplexer used by the conventional data transmission system.
Figure 4:
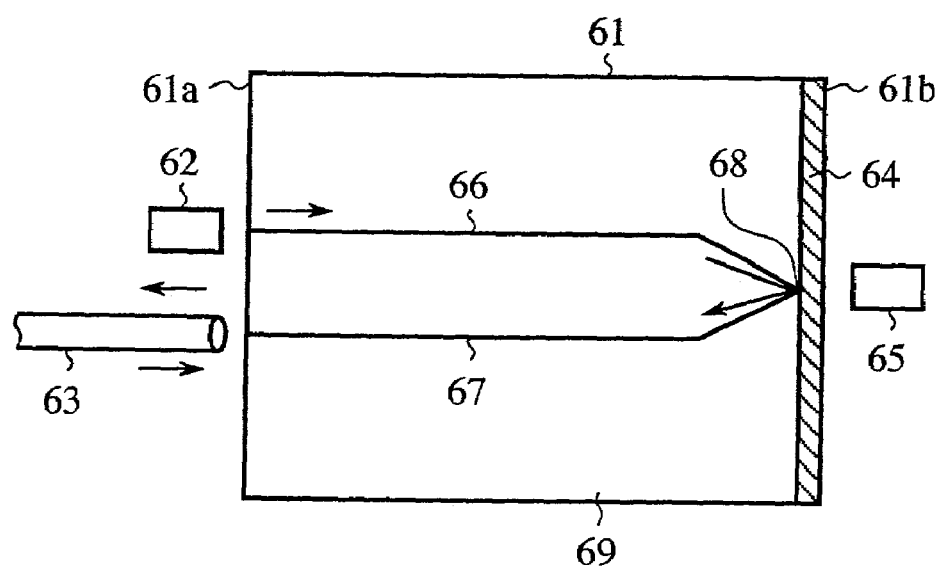
FIG. 4 is a schematic diagram showing a configuration of a wavelength division multiplexer/demultiplexer (WDM) used by the data transmission system in accordance with the present invention.

FIG. 4 is a schematic diagram illustrating an example of the wavelength division multiplexer/demultiplexer (WDM) 41a (41b or the like). In FIG. 4, the reference numeral 61 designates a waveguide chip; 62 designates a transmitting laser diode (LD) disposed on a first end surface 61a side of the waveguide chip 61 to emit light with a 1300 nm wavelength region; 63 designates an optical fiber disposed on the first end surface 61a side of the waveguide chip 61 to receive external light with a 1500 nm wavelength region; 64 designates a wavelength division multiplexer/demultiplexer (WDM) disposed on a second end surface 61b of the waveguide chip 61; and 65 designates a receiving photodiode (PD) disposed on the second end surface 61b side of the waveguide chip 61.

In the waveguide chip 61, the reference numeral 66 designates a first optical waveguide for propagating the light with the 1300 nm wavelength region emitted from the transmitting laser diode (LD) 62; 67 designates a second optical waveguide for propagating the light with the 1500 nm wavelength region supplied via the optical fiber 63, and the light with the 1300 nm wavelength region passing through the first optical waveguide 66 and reflecting off the wavelength division multiplexer/demultiplexer (WDM) 64; and 68 designates a junction of the first optical waveguide 66 and the second optical waveguide 67 formed by connecting the WDM filter side end of the first optical waveguide 66 with the WDM filter side end of the second optical waveguide 67.

The receiving photodiode (PD) 65 is placed normally to the second optical waveguide 67 with respect to the wavelength division multiplexer/demultiplexer (WDM) 64, and closely to the junction 68 of the first optical waveguide 66 and the second optical waveguide 67. The junction 68 of the first optical waveguide 66 and the second optical waveguide 67 constitutes an emitting position of the light with the 1500 nm wavelength region that propagates the second optical waveguide 67 and is output from the optical waveguide 61.

The light with the 1300 nm wavelength region emitted from the transmitting laser diode (LD) 62 reflects off the wavelength division multiplexer/demultiplexer (WDM) 64, and is supplied to the optical fiber 63 to be output. On the other hand, the light with the 1500 nm wavelength region input through the optical fiber 63 passes through the wavelength division multiplexer/demultiplexer (WDM) 64, and is supplied to the receiving photodiode (PD) 65.

Figure 5:
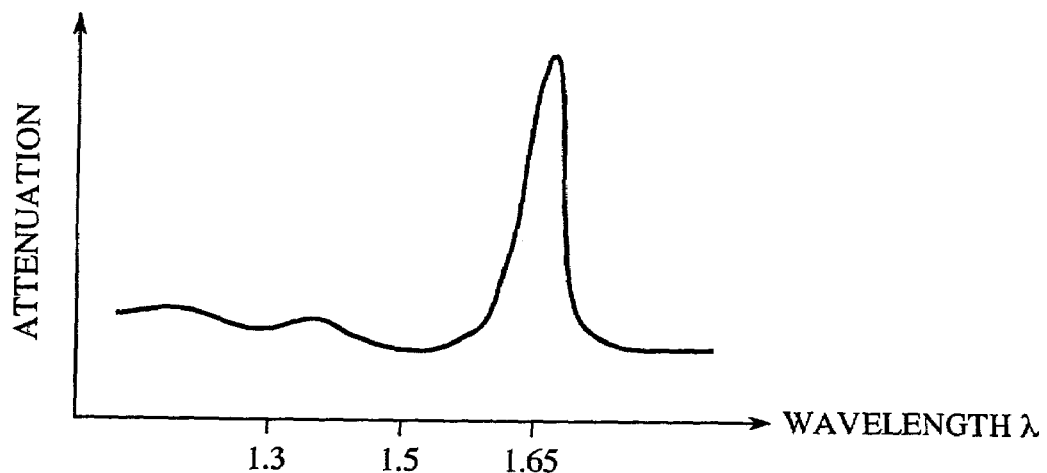
FIG. 5 is a graph illustrating the attenuation at the wavelength in the optical waveguide section of the wavelength division multiplexer/demultiplexer (WDM)

Using a polymer such as polyimide for the second optical waveguide 67 can offer the characteristics as illustrated in FIG. 5, in which a 1650 nm wavelength region is sharply attenuated. Accordingly, setting the wavelength of the video signal near 1650 nm enables the input video signal to be attenuated, and the signals other than the video signal to be transmitted.

Alternatively, multiple notches 73 as shown in FIGS. 6(a) and 6(b), which are formed in the cladding of an optical fiber consisting of a core 71 and a cladding 72 covering the external surface of the core 71, makes it possible to reflect a particular wavelength signal of an input signal, thereby rejecting it. In addition, a dielectric multilayer 76 as shown in FIG. 6(c), which is disposed at an end surface of the optical fiber 75, can reflect the wavelength equal to or greater than 1650 nm, thereby rejecting it. Thus, the optical fibers as shown in FIGS. 6(a)-6(c) can also be used as the wavelength division multiplexer/demultiplexer (WDM) of the subscriber unit.

Next, the operation will be described.

In the central office unit 1, the video signal generator 11 supplies its video signal to the transmitting laser diode (LD) 12. The transmitting laser diode (LD) 12 supplies it to the wavelength division multiplexer/demultiplexer (WDM) 13 in the form of the optical signal. The wavelength division multiplexer/demultiplexer (WDM) 13 multiplexes the optical signal with the optical signal from the transmitting and receiving section 14, and supplies it to the star coupler 2 via the optical fiber 3. The star coupler 2 splits the signal and supplies them to the subscriber units 5a, 5b and so on.

In the subscriber unit 5a, the wavelength division multiplexer/demultiplexer (WDM) 31a demultiplexes the input signal into the video signal and the other signals, and supplies the video signal to the video receiver 33a via the receiving photodiode (PD) 32a. On the other hand, the signals other than the video signal are supplied to the receiving photodiode (PD) 42a via the wavelength division multiplexer/demultiplexer (WDM) 41a in the transmitting and receiving section 34a, to be converted into the electric signal. Then, the electric signal multiplexer/demultiplexer 44a demultiplexes the electric signal into respective signals so that the telephone signal is supplied to the telephone set 47a via the A/D converter 45a, and the facsimile signal is supplied to the facsimile machine 48a via the A/D converter 46a. As for the computer signal, the electric signal multiplexer/demultiplexer 44a supplies it directly to the personal computer 49a.

On the other hand, as for the signals supplied from the devices connected to the subscriber unit 5a such as the signal from the telephone set 47a, for example, the A/D converter 45a converts it to the digital signal, and supplies it to the transmitting laser diode (LD) 43a via the electric signal multiplexer/demultiplexer 44a. The transmitting laser diode (LD) 43a converts it to the optical signal, and supplies it to the star coupler 2 via the wavelength division multiplexer/demultiplexers (WDMs) 41a and 31a and the optical fiber 4a. The star coupler 2 sends it to the central office unit 1 via the optical fiber 3, where it is supplied to the receiving photodiode (PD) 23 via the wavelength division multiplexer/demultiplexers (WDMs) 13 and 21, to be converted into the electric signal and output. The output signal passes through the signal processor 24 and the electric signal multiplexer/demultiplexer 15, and is supplied to the processing section 16, where it passes through the signal processor 17, and is converted to the optical signal by the transmitting laser diode (LD) 18, again, to be transmitted to another station.

On the other hand, the subscriber unit 5b, which requires no video service, does not comprise the corresponding wavelength division multiplexer/demultiplexer (WDM). Thus, the signal that is split by the star coupler 2 and includes the video signal is directly input to the wavelength division multiplexer/demultiplexer 41b. The wavelength division multiplexer/demultiplexer 41b, however, rejects the wavelength of the video signal by absorbing or reflecting it. Therefore, only the signals other than the video signal are transmitted to the receiving photodiode (PD) 42b.

Figure 6:
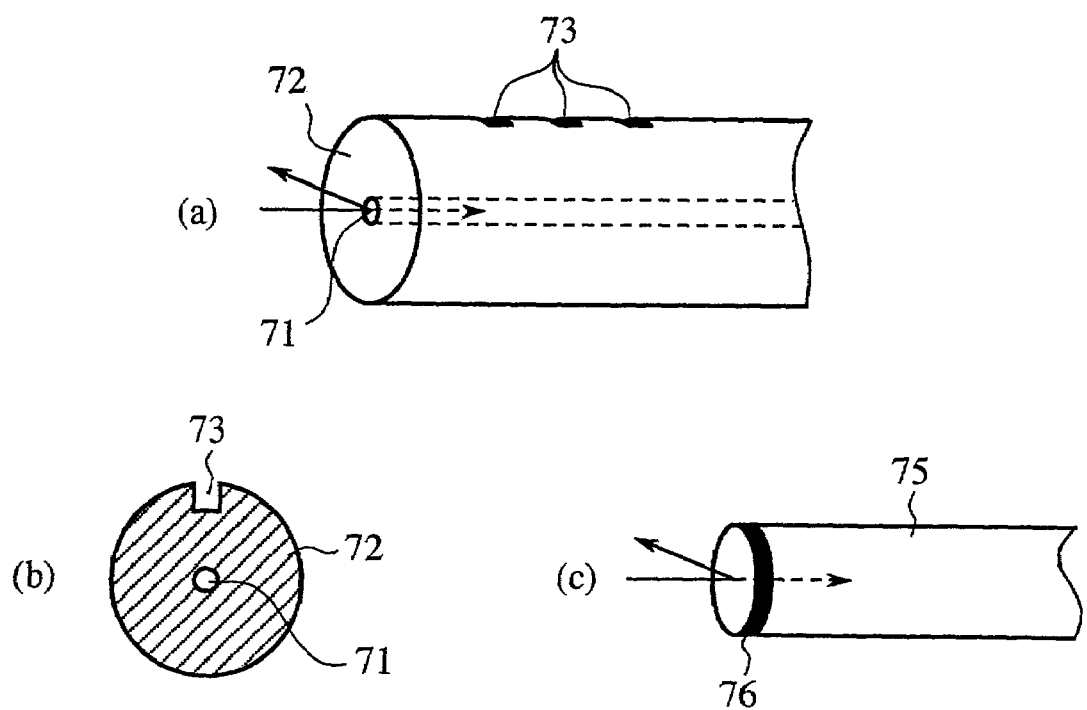
FIG. 6 is a schematic diagram showing other configurations of a wavelength division multiplexer/demultiplexer (WDM) used by the data transmission system in accordance with the present invention.

As described above, the present embodiment 1 is configured such that the subscriber unit of a subscriber who does not want to receive the video service utilizes the wavelength division multiplexer/demultiplexer (WDM) that absorbs the wavelength region of the video signal (FIG. 4), or the wavelength division multiplexer/demultiplexer (WDM) that reflects the wavelength region of the video signal (FIG. 6). Thus, the subscriber unit can reject the video signal even if the video signal and the other signals sent from the central office unit 1 are input together. Accordingly, it obviates the expensive spatial optical filter which is conventionally required for separating the video signal and the other signals. As a result, a low cost subscriber unit is implemented, which enables a subscriber who does not receive the video service to use the inexpensive subscriber unit.

Besides, the present embodiment 1 can utilize any of the wavelength division multiplexer/demultiplexers (WDMs) as shown in FIG. 6 that reflect the wavelength region of the video signal as the second wavelength division multiplexer/demultiplexer (WDM) 41a among the first and second wavelength division multiplexer/demultiplexers (WDMs) 31a and 41a of the subscriber unit 5a. Thus, the second wavelength division multiplexer/demultiplexer (WDM) 41a can remove the video signal the first wavelength division multiplexer/demultiplexer (WDM) 31a cannot fully eliminate. Therefore, a comparatively low separation accuracy, inexpensive WDM can be used as the first wavelength division multiplexer/demultiplexer (WDM) 31a.

Embodiment 2

Figure 7:
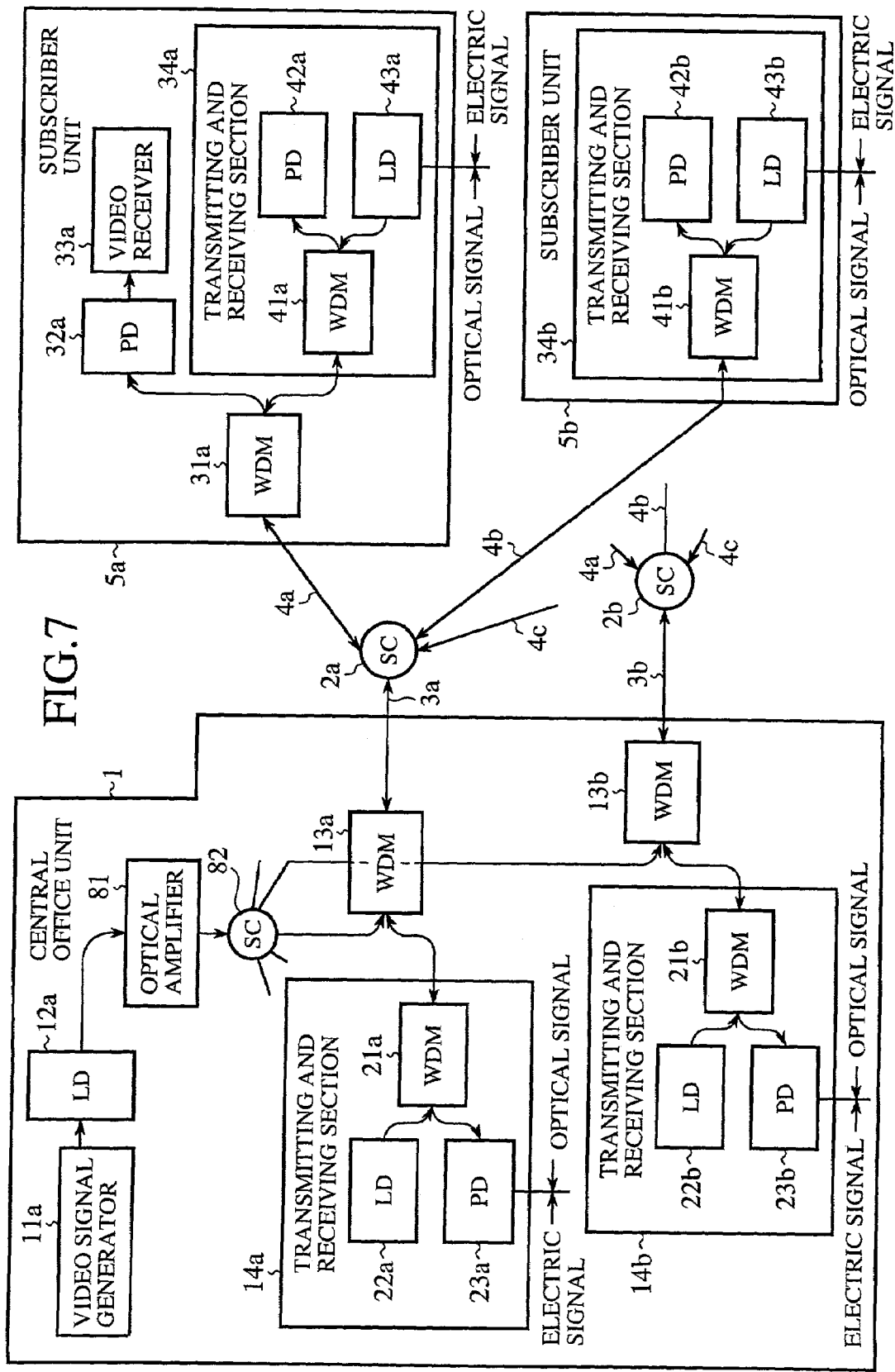
FIG. 7 is a block diagram showing a configuration of an embodiment 2 of the data transmission system in accordance with the present invention.

FIG. 7 is a block diagram showing a configuration of an embodiment 2 of the data transmission system in accordance with the present invention. In the present embodiment 2, the central office unit 1 multiplexes the video signal onto the outputs of the plurality of transmitting and receiving sections 14a and 14b. In this case, when the output of the transmitting laser diode 12a is split directly to n parts by the star coupler 82 serving as the optical distributor, the output level of the star coupler 82 will reduce by a factor of n. Thus, the output of the transmitting laser diode 12a is amplified by an optical amplifier 81 before split by the star coupler 82. Since the remaining configuration is the same as that of the foregoing embodiment 1, the description thereof is omitted here. Besides, FIG. 7 shows those components of the embodiment 1 that transmit only the optical signals.

Next, the operation will be described.

In the central office unit 1, the video signal generator 11a supplies its output signal to the transmitting laser diode (LD) 12a. The transmitting laser diode (LD) 12a outputs a signal in the 1650-1660 nm wavelength region, which is amplified by the optical amplifier 81. The star coupler (SC) 82 splits the signal, and supplies the split signals to the wavelength division multiplexer/demultiplexer (WDM) 13a (13b). It multiplexes the signal with the output of the wavelength division multiplexer/demultiplexer (WDM) 21a (21b) of the transmitting and receiving section 14a (14b), which is obtained by multiplexing the signals from the telephone, facsimile machine and personal computer, for example.

Subsequently, the output of the wavelength division multiplexer/demultiplexer 13a (13b) is transmitted to the star coupler (SC) 2a (–2n) via the optical fiber 3a (3b). The star coupler (SC) 2a (2b) splits it and supplies to the subscriber unit 5a (the subscriber units for the star coupler 2b are not shown). Then, the subscriber unit 5a, which comprises the video receiver 33a, separates the video signal from the remaining signal using the wavelength division multiplexer/demultiplexer 31a. The video signal is supplied to the receiving photodiode (PD) 32a that converts it into the electric signal and supplies it to the video receiver 33a.

On the other hand, the subscriber unit 5b requiring no video service does not include the corresponding wavelength division multiplexer/demultiplexer (WDM). Thus, the signal that is split by the star coupler 2a and includes the video signal is directly input to the wavelength division multiplexer/demultiplexer 41b. The wavelength division multiplexer/demultiplexer 41b, however, rejects the wavelength of the video signal by absorbing or reflecting it. Therefore, only the signals other than the video signal are transmitted to the receiving photodiode (PD) 42b.

As described above, the present embodiment 2 is configured such that it shares the video signal source, the output of which is multiplexed with the outputs of the multiple transmitting and receiving sections 14a and 14b in the central office unit 1. Accordingly, the present embodiment can reduce the total cost of the data transmission system.

Embodiment 3

Figure 8:
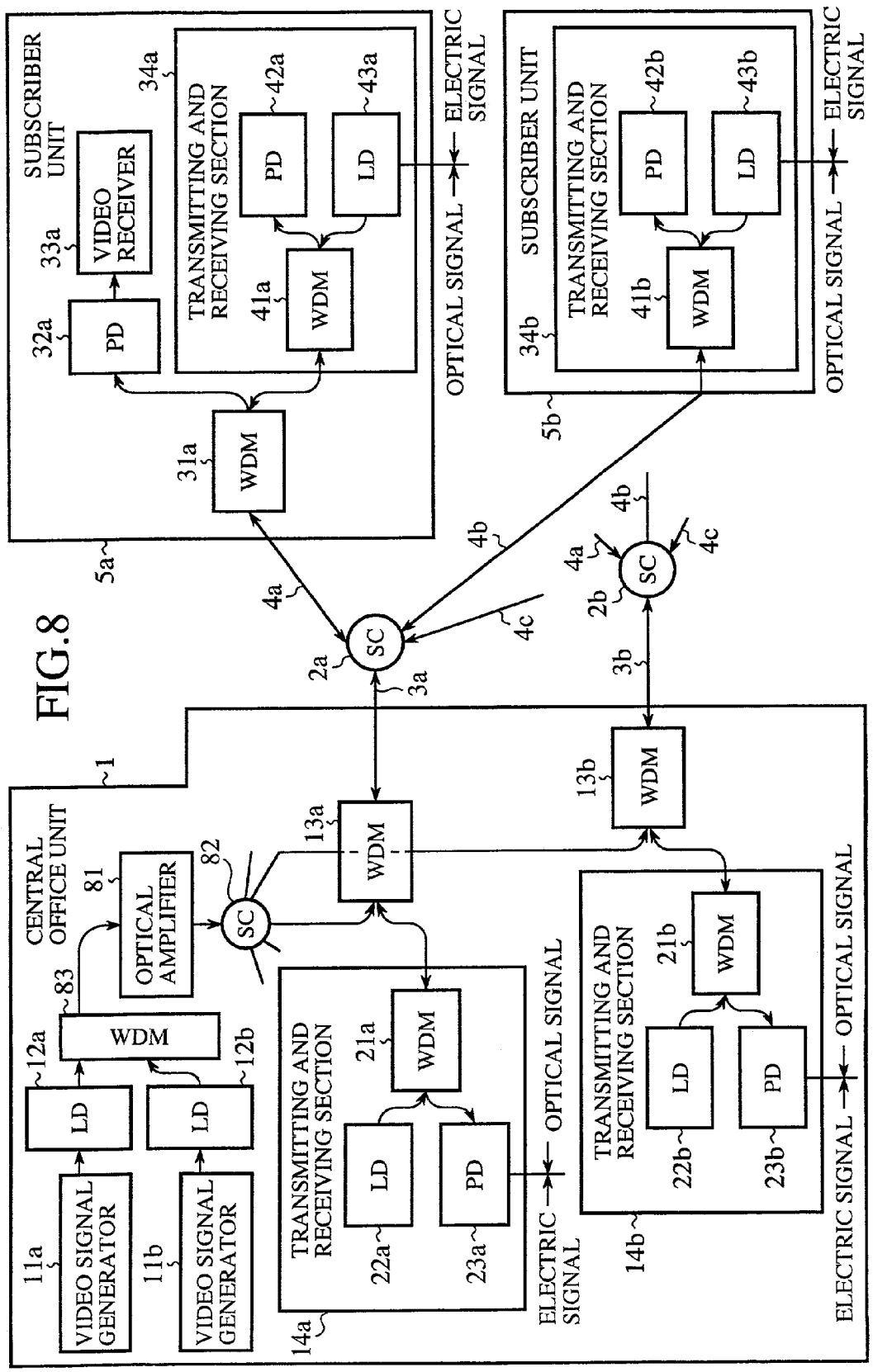
FIG. 8 is a block diagram showing a configuration of an embodiment 3 of the data transmission system in accordance with the present invention.

FIG. 8 is a block diagram showing a configuration of an embodiment 3 of the data transmission system in accordance with the present invention. In the present embodiment 3, the central office unit 1 comprises multiple video signal generators 11a and 11b, the outputs of which are multiplexed by a first wavelength division multiplexer/demultiplexer (WDM) 83. Its output is amplified by the optical amplifier 81, split by the star coupler 82, and then multiplexed by the second wavelength division multiplexer/demultiplexer (WDM) 13a. Since the remaining configuration and the operation is the same as that of the foregoing embodiment 2, the description thereof is omitted here. Besides, FIG. 8 shows those components of the embodiment 1 that transmit only the optical signals.

As described above, the embodiment 3 is configured such that the first wavelength division multiplexer/demultiplexer (WDM) 83 multiplexes the multiple video signals. Therefore, the present embodiment 3 can easily cope with the growing capacity in the future.

Although the foregoing embodiments are described taking an example of the ATM-PDS (asynchronous transfer mode passive double star) system, in which the star coupler (SC) 2a (2b . . . ) splits the signal supplied from the central office unit 1 via the optical fiber 3a (3b . . . ), and its split output terminals are connected to the subscriber units via the optical fibers 4a, 4b . . . , such a configuration is not essential. For example, an ATM-PDS (asynchronous transfer mode passive double star) system is also possible which does not use any star coupler (SC) 2a (2b . . . ) as the optical distributor, and which comprises multiple central office units 1 having one-to-one correspondence with the subscriber units 5a and 5b connected thereto. In this case, the ATM-PDS system is configured such that the central office unit 1 multiplexes the multiple signals, and transmits them to the subscriber unit 5a, and that the subscriber unit 5a employs the wavelength division multiplexer/demultiplexer (WDM) that reflects of absorbs the wavelength region of a particular signal when it does not receive the particular signal. Thus, it can provides a subscriber with the inexpensive subscriber unit.

INDUSTRIAL APPLICABILITY

As described above, the data transmission system according to the present invention enables the central office unit to deliver the video signal to the individual subscriber units, and enables the subscriber units to receive the video signal. Thus, it can provide subscribers who do not want to receive the video services with the inexpensive subscriber unit.

What is claimed is:

1. A data transmission system comprising:
a plurality of subscriber units including at least a subscriber unit with a video receiver and a subscriber unit without a video receiver, each of the plurality of subscriber units is configured to interconnect with a central office unit via optical fibers, the central office unit is configured to multiplex a video signal with signals other than the video signal and to deliver them to the plurality of subscriber units, wherein each subscriber unit is configured to demultiplex a received signal, and
the subscriber unit without the video receiver includes a first wavelength division multiplexer/demultiplexer configured to attenuate a particular wavelength signal,
the subscriber unit with the video receiver is configured to separate the video signal from the multiplexed signal received at a second wavelength division multiplexer/demultiplexer and to input the video signal to the video receiver, and
wherein the subscriber unit without the video receiver is configured to separate the video signal from the multiplexed signal received at the first wavelength division multiplexer/demultiplexer, to attenuate the video signal without a terminator to prevent further downstream transmission of the video signal with respect to the first wavelength division multiplexer/demultiplexer, to separate the signals other than the video signal, and to input the signals other than the video signal to a transmitting and receiving section, and
the subscriber unit without the video receiver includes a transmitting laser diode and a receiving photodiode, the transmitting photodiode is disposed outside of the first wavelength division multiplexer/demultiplexer and on a first end surface of the first wavelength division multiplexer/demultiplexer, and the receiving photodiode is disposed outside of the second wavelength division multiplexer/demultiplexer and on second end surface, opposite the first end surface, of the first wavelength division multiplexer/demultiplexer.

2. The data transmission system according to claim 1, wherein said wavelength division multiplexer/demultiplexer is configured to reflect the particular wavelength signal to reject its input.

3. The data transmission system according to claim 1, wherein said wavelength division multiplexer/demultiplexer comprises a reflecting layer configured to reflect the particular wavelength signal at an input end surface of an optical fiber of the subscriber unit.

4. The data transmission system according to claim 3, wherein said reflecting layer comprises a dielectric multilayer filter.

5. The data transmission system according to claim 1, further comprising an optical fiber with a core and a cladding that covers an external surface of the core, and that has multiple notches formed on the cladding to reflect the particular wavelength signal.

6. The data transmission system according to claim 1, wherein said wavelength division multiplexer/demultiplexer comprises an optical wave guide that is made of a polymer and absorbs a signal with a wavelength of 1650 nm, which is employed as the particular wavelength signal.

7. The data transmission system according to claim 1, wherein said wavelength multiplexer/demultiplexer includes a first optical waveguide, a second optical waveguide, and a filter positioned such that the first optical waveguide and the second optical waveguide form a junction at the filter.

8. A data transmission system including: a plurality of subscriber units, having at least a subscriber unit with a video receiver and a subscriber unit without a video receiver, each of the plurality of subscriber units is configured to interconnect with a central office unit via optical fibers, the central office unit configured to multiplex a video signal with signals other than the video signal and to deliver them to the plurality of subscriber units, and said central office unit comprises:

an optical amplifier configured to amplify the video signal to be transmitted; and an optical distributor configured to distribute the video signal output from said optical amplifier and to supply the video signal output to a wavelength division multiplexer/demultiplexer, wherein said subscriber unit without the video receiver comprises a first wavelength division multiplexer/demultiplexer configured to attenuate a particular wavelength signal, wherein the subscriber unit with the video receiver is configured to separate the video signal from the multiplexed signal received at a second wavelength division multiplexer/demultiplexer and to input the video signal to the video receiver, wherein the subscriber unit without the video receiver is configured to separate the video signal from the multiplexed signal received at the first wavelength division multiplexer/demultiplexer, to attenuate the video signal without a terminator to prevent further downstream transmission of the video signal with respect to the first wavelength division multiplexer/demultiplexer, to separate the signals other than the video signal, and to input the signals other than the video signal to a transmitting and receiving section, and the subscriber unit without the video receiver includes a transmitting laser diode and a receiving photodiode, the transmitting photodiode is disposed outside of the first wavelength division multiplexer/demultiplexer and on a first end surface of the first wavelength division multiplexer/demultiplexer, and the receiving photodiode is disposed outside of the second wavelength division multiplexer/demultiplexer and on second end surface, opposite the first end surface, of the first wavelength division multiplexer/demultiplexer.

9. The data transmission system according to claim 8, wherein said wavelength multiplexer/demultiplexer includes a first optical waveguide, a second optical waveguide, and a filter positioned such that the first optical waveguide and the second optical waveguide form a junction at the filter.

10. A data transmission system including: a plurality of subscriber units, having at least a subscriber unit with a video receiver and a subscriber unit without a video receiver, the plurality of subscriber units configured to interconnect with a central office unit via optical fibers, the central office unit configured to multiplex a video signal with signals other than the video signal and to deliver them to the plurality of subscriber units, wherein each of the plurality of subscriber units is configured to demultiplex a received signal, and said central office unit comprises:

a plurality of video signal generators configured to generate video signals with different wavelengths;

a first wavelength division multiplexer/demultiplexer configured to multiplex the video signals supplied from said plurality of video signal generators;

an optical amplifier configured to amplify the video signals output from said first wavelength division multiplexer/demultiplexer; and an optical distributor configured to distribute the video signals output from said optical amplifier to a second wavelength division multiplexer/demultiplexer, wherein the subscriber unit without the video receiver comprises a first wavelength division multiplexer/demultiplexer configured to eliminate a particular wavelength signal from said subscriber unit without the video receiver, the subscriber unit with the video receiver is configured to separate the video signal from the multiplexed signal received at a second wavelength division multiplexer/demultiplexer and to input the video signal to the video receiver, the subscriber unit without the video receiver is configured to separate the video signal from the multiplexed signal received at the first wavelength division multiplexer/demultiplexer, to attenuate the video signal without a terminator to prevent further downstream transmission of the video signal with respect to the first wavelength division multiplexer/demultiplexer, to separate the signals other than the video signal, and to input the signals other than the video signal to a transmitting and receiving section, and the subscriber unit without the video receiver includes a transmitting laser diode and a receiving photodiode, the transmitting photodiode is disposed outside of the first wavelength division multiplexer/demultiplexer and on a first end surface of the first wavelength division multiplexer/demultiplexer, and the receiving photodiode is disposed outside of the second wavelength division multiplexer/demultiplexer and on second end surface, opposite the first end surface, of the first wavelength division multiplexer/demultiplexer.

11. The data transmission system according to claim 10, wherein said wavelength multiplexer/demultiplexer includes a first optical waveguide, a second optical waveguide, and a filter positioned such that the first optical waveguide and the second optical waveguide form a junction at the filter.

12. A data transmission system including: a plurality of subscriber units, having at least a subscriber unit with a video receiver and a subscriber unit without a video receiver, the plurality of subscriber units configured to interconnect with a central office unit via optical fibers, the central office unit configured to multiplex a video signal with signals other than the video signal and to deliver them to the plurality of subscriber units, and the subscriber unit without the video receiver comprises:

a first wavelength division multiplexer/demultiplexer configured to demultiplex the video signals and signals other than the video signal; and a second wavelength division multiplexer/demultiplexer configured to attenuate a particular wavelength signal, wherein the subscriber unit with the video receiver is configured to separate the video signal from the multiplexed signal received at a third wavelength division multiplexer/demultiplexer and to input the video signal to the video receiver, and the subscriber unit without the video receiver is configured to separate the video signal from the multiplexed signal received at the second wavelength division multiplexer/demultiplexer, to attenuate the video signal without a terminator to prevent further downstream transmission of the video signal with respect to the second wavelength division multiplexer/demultiplexer, to separate the signals other than the video signal, and to input the signal other than the video signal to a transmitting and receiving section, and the subscriber unit without the video receiver includes a transmitting laser diode and a receiving photodiode, the transmitting photodiode is disposed outside of the second wavelength division multiplexer/demultiplexer and on a first end surface of the second wavelength division multiplexer/demultiplexer, and the receiving photodiode is disposed outside of the second wavelength division multiplexer/demultiplexer and on second end surface, opposite the first end surface, of the second wavelength division multiplexer/demultiplexer.

13. The data transmission system according to claim 12, wherein at least said first wavelength multiplexer/demultiplexer includes a first optical waveguide, a second optical waveguide, and a filter positioned such that the first optical waveguide and the second optical waveguide form a junction at the filter.

* * * * *